United States Patent
Rofougaran

(10) Patent No.: US 8,489,019 B2
(45) Date of Patent: *Jul. 16, 2013

(54) SIGNAL REPEATER UTILIZING BEAMFORMING FOR SPATIAL ISOLATION

(75) Inventor: Ahmadreza (Reza) Rofougaran, Newport Coast, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/572,345

(22) Filed: Aug. 10, 2012

(65) Prior Publication Data
US 2012/0302161 A1 Nov. 29, 2012

Related U.S. Application Data

(63) Continuation of application No. 11/864,735, filed on Sep. 28, 2007, now Pat. No. 8,244,175.

(51) Int. Cl.
*H04B 7/15* (2006.01)
(52) U.S. Cl.
USPC .................................. 455/25; 455/10; 455/20
(58) Field of Classification Search
None
See application file for complete search history.

(56) References Cited

U.S. PATENT DOCUMENTS

| 4,901,307 A * | 2/1990 | Gilhousen et al. ............ 370/320 |
| 8,244,175 B2 * | 8/2012 | Rofougaran .................... 455/25 |
| 2008/0002652 A1 * | 1/2008 | Gupta et al. .................. 370/338 |

* cited by examiner

*Primary Examiner* — Philip Sobutka
(74) *Attorney, Agent, or Firm* — Farjami & Farjami LLP

(57) ABSTRACT

A repeater device may be utilized to enable forwarding extreme high frequency (EHF) communication between EHF-enabled wireless devices. The repeater device may utilize spatial isolation to prevent and/or reduce interference between received and transmitted EHF RF signals, wherein reception and/or transmission of EHF RF signals in the repeater device may be performed via narrow beams that may enable minimal interference by transmit EHF RF signals to reception of EHF RF. The repeater device may utilize phased arrays to enable performing beamforming, and signal processing operations, including shift and/or amplitude adjustment, may be performed on signals received and/or transmitted via antenna elements in the phased arrays to enable beamforming during reception and transmission of EHF RF signals. Signal processing operations performed in the repeater device may be modifiable to enable continued spatial isolation between receive and transmit EHF RF signal in the repeater device.

20 Claims, 5 Drawing Sheets

SIGNAL REPEATER UTILIZING BEAMFORMING FOR SPATIAL ISOLATION

This is a continuation of application Ser. No. 11/864,735 filed Sep. 28, 2007 now U.S. Pat. No. 8,244,175.

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to wireless communication. More specifically, certain embodiments of the invention relate to a method and system for a signal repeater with gain control and spatial isolation.

BACKGROUND OF THE INVENTION

In 2001, the Federal Communications Commission (FCC) designated a large contiguous block of 7 GHz bandwidth for communications in the 57 GHz to 64 GHz spectrum. This frequency band was designated for use on an unlicensed basis, that is, the spectrum is accessible to anyone, subject to certain basic, technical restrictions such as maximum transmission power and certain coexistence mechanisms. The communications taking place in this band are often referred to as '60 GHz communications.' With respect to accessibility of this designated portion of the spectrum, 60 GHz communications is similar to other forms of unlicensed spectrum use, for example Wireless LANs (WLAN) or Bluetooth in the 2.4 GHz ISM bands. However, communications at 60 GHz may be significantly different in aspects other than accessibility. For example, 60 GHz signals may provide markedly different communications channel and propagation characteristics, at least due to the fact that 60 GHz radiation is partly absorbed by oxygen in the air, leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a signal repeater with gain control and spatial isolation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a signal repeater with gain control and spatial isolation. A repeater device may be utilized to enable forwarding extreme high frequency (EHF) communication between EHF-enabled wireless devices. The repeater device may utilize spatial isolation to prevent and/or reduce interference between received and transmitted EHF RF signals, wherein reception and/or transmission of EHF RF signals in the repeater device may be performed via narrow beams that may enable mitigation or elimination of interference due to transmitted EHF RF signals to reception of EHF RF. The repeater device may utilize phased arrays to enable performing beamforming, and signal processing operations, including shift and/or amplitude adjustment, may be performed on signals received and/or transmitted via antenna elements in the phased arrays to enable beamforming during reception and transmission of EHF RF signals. Signal processing operations performed in the repeater device may be modifiable to enable modifications based on information received from the EHF-enabled wireless devices to enable continued spatial isolation between receive and transmit EHF RF signal in the repeater device.

Figure 1:
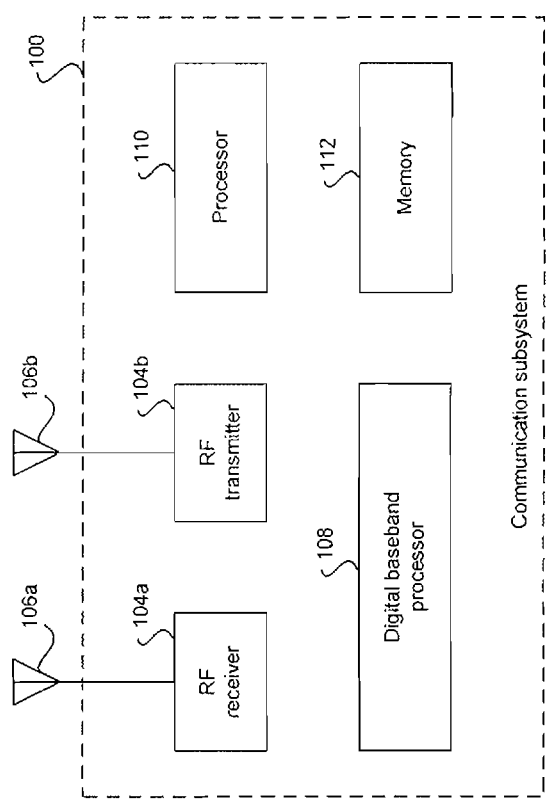
FIG. 1 is a block diagram illustrating an exemplary communication subsystem, which may be utilized in connection with an embodiment of the invention.

FIG. 1 is a block diagram illustrating an exemplary communication subsystem, which may be utilized in accordance with an embodiment of the invention. Referring to FIG. 1, there is shown a communication subsystem 102, an RF receiver 104a, an RF transmitter 104b, a receive antenna 106a, a transmit antenna 106b, a digital baseband processor 108, a processor 110, and a memory 112.

The communication subsystem 102 may comprise the RF receiver 104a, the RF transmitter 104b, the receive antenna 106a, the transmit antenna 106b, the digital baseband processor 108, the processor 110, the memory 112, and may also comprise additional suitable logic, circuitry, and/or code that may enable receiving, transmitting, and processing of RF signals. For example, the communication subsystem 102 may be integrated or located within a wireless device to enable operations in a wireless system, such as the cellular network and/or digital video broadcast network.

The receive antenna 106a may comprise suitable logic, circuitry, and/or code that may enable reception of RF signals; receive antenna 106a may be communicatively coupled to the RF receiver 104a. The RF receiver 104a may comprise suitable logic, circuitry, and/or code that may enable processing of received RF signals. The RF receiver 104a may enable receiving extremely high frequency (EHF) signals at, for example, approximately 60 GHz. In this regard, the RF receiver 104a may be enabled to generate signals, such as local oscillator signals, for the reception and processing of EHF signals. The RF receiver 104a may down-convert received RF signals to a baseband frequency signal. The RF receiver 104a may perform direct down-conversion of the received RF signals to a baseband frequency signal, for example. In some instances, the RF receiver 104a may enable analog-to-digital conversion of the baseband signal components before transferring the components to the digital baseband processor 108. In other instances, the RF receiver 104a may transfer the baseband signal components in analog form. The receive antenna 106a and the RF receiver 104a may also enable reception of non-EHF RF signals. For example, the receive antenna 106a and the RF receiver 104a may enable receiving and/or processing of Bluetooth RF signals.

The transmit antenna 106b may comprise suitable logic, circuitry, and/or code that may enable transmission of RF signals; the transmit antenna 106b may be communicatively coupled to the RF transmitter 104b. The RF transmitter 104b may comprise suitable logic, circuitry, and/or code that may enable processing of RF signals for transmission. The RF transmitter 104b may enable transmission of extremely high frequency (EHF) signals at, for example, approximately 60 GHz. In this regard, the RF transmitter 104b may be enabled to generate signals, such as local oscillator signals, for the transmission and processing of EHF signals. The RF transmitter 104b may up-convert the baseband frequency signal to an RF signals. The RF transmitter 104b may perform direct up-conversion of the baseband frequency signal to a RF signals of approximately 60 GHz, for example. In some instances, the RF transmitter 104b may enable digital-to-analog conversion of the baseband signal components received from the digital baseband processor 108 before up conversion. In other instances, the RF transmitter 104b may receive baseband signal components in analog form. The transmit antenna 106b and the RF transmitter 104b may also enable transmission of non-EHF RF signals. For example, the transmit antenna 106b and the RF transmitter 104b may enable transmitting and/or processing of Bluetooth RF signals.

The digital baseband processor 108 may comprise suitable logic, circuitry, and/or code that may enable processing and/or handling of baseband frequency signals. In this regard, the digital baseband processor 108 may process or handle signals received from the RF receiver 104a and/or signals to be transferred to the RF transmitter 104b. The digital baseband processor 108 may also provide control and/or feedback information to the RF receiver 104a and to the RF transmitter 104b based on information from the processed signals. The digital baseband processor 108 may communicate information and/or data from the processed signals to the processor 110 and/or to the memory 112. Moreover, the digital baseband processor 108 may receive information from the processor 110 and/or to the memory 112, which may be processed and transferred to the RE transmitter 104b for transmission to the network.

The processor 110 may comprise suitable logic, circuitry, and/or code that may enable control and/or data processing operations for the communication subsystem 102. The processor 110 may be utilized to control at least a portion of the RF receiver 104a, the RF transmitter 104b, the digital baseband processor 108, and/or the memory 112. In this regard, the processor 110 may generate at least one signal for controlling operations within the communication subsystem 102. The processor 110 may also enable executing of applications that may be utilized by the communication subsystem 102. For example, the processor 110 may execute applications that may enable displaying and/or interacting with content received via RF signals in the communication subsystem 102.

The memory 112 may comprise suitable logic, circuitry, and/or code that may enable storage of data and/or other information utilized by the communication subsystem 102. For example, the memory 112 may be utilized for storing processed data generated by the digital baseband processor 108 and/or the processor 110. The memory 112 may also be utilized to store information, such as configuration information, that may be utilized to control the operation of at least one block in the communication subsystem 102. For example, the memory 112 may comprise information necessary to configure the RF receiver 104a to enable receiving signals in the appropriate frequency band.

In operation, the communication subsystem 102 may enable communication via RF interfaces. The communication subsystem 102 may be integrated within wireless devices to enable communication via an EHF interface, for example the 60 GHz band. For example, the communication subsystem 102 may receive RF signals operating in the 60 GHz band via the receive antenna 106a; wherein the RF receiver 104a may enable initial processing of the received signal. The communication subsystem 102 may transmit RF signals operating in the 60 GHz band via the RF transmitter 104b and the transmit antenna 106b. The digital baseband processor 108, the processor 110, and the memory 112 may enable performing control and/or related operation during transmission and/or reception of RF signals. For example, the memory 112 may be utilized to store and/or fetch data that may be received and/or transmitted via 60 GHz RF signals. The digital 108 may enable performing signal processing operation such as analog-to-digital conversion, encoding/decoding of received and/or transmitted data via the 60 GHz RF signals. The processor 110 may enable controlling of the operations of the communication subsystem 102. For example, the processor 110 may enable operating of the transmit and/or the receive antennas to enable aligning during 60 GHz RF communications.

In addition to EHF communications, which may have limited operational range compared with lower frequency RF interfaces, the communication subsystem 102 may be enabled to utilize other wireless interfaces and/or protocols. For example, the communication subsystem 102 may be enabled to utilize such wireless interfaces as Bluetooth to perform Bluetooth RF communications. Accordingly, the receive antenna 106a, the RF receiver 104a, and/or other components within the communication subsystem 102 may enable reception of non-EHF RF signals, for example, Bluetooth RF signals. Similarly, the transmit antenna 106b, the RF transmitter 104b, and/or other components within the communication subsystem 102 may enable transmission of non-EHF RF signals, for example, Bluetooth RF signals. The non-EHF interfaces that may be supported in the communication subsystem 102 may be utilized to send information regarding the communication subsystem 102. For example, a Bluetooth connection may be utilized to send information regarding the capability of the communication subsystem 102 and/or to receive messages containing information regarding preferred setting that may be utilized while performing EHF communication.

In an embodiment of the invention, repeater devices may be utilized to extend the range of EHF communication between wireless devices that may comprise the communication system 100. The EHF communication may generally have limited range, typically operating only in "line-of-sight" settings. Consequently, it may be desirable to utilize other devices, for example, repeater devices, to extend the range of communication between EHF-enabled devices. However, while use of repeater devices in forwarding EHF RF signals between EHF-enabled wireless devices may enable extending the range of such communication, isolation mechanisms that prevent and/or reduce interference between receive and transmit EHF RF signals at such repeater devices may be necessary. For example, beamforming may be utilized to achieve spatial isolation in repeater devices, wherein receive and transmit EHF RF signals in the repeater devices may be performed via narrow beams that may enable minimal interference by transmit EHF RF signals to reception of EHF RF signals received in the repeater devices. Additionally, signal gain may be applied to the transmit EHF RF signals, wherein the signal strength of transmit EHF RF signals may be increased to a maximum allowable value that enables maintaining and/or maximizing polarization isolation between the transmit and receive EHF RF signals.

Figure 2:
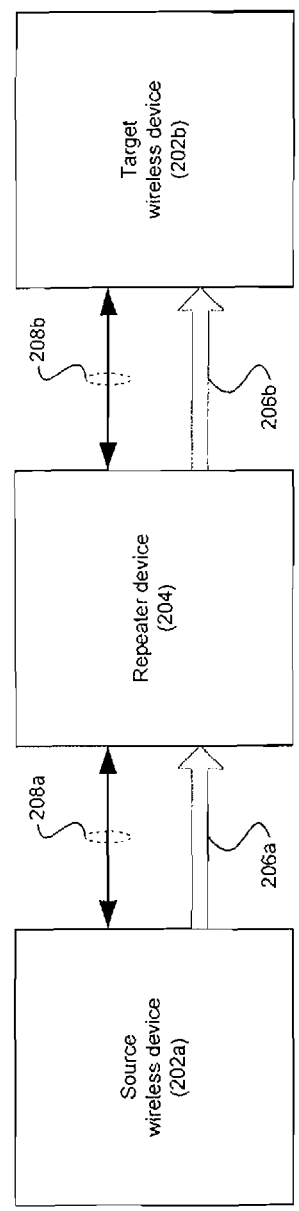
FIG. 2 is a block diagram illustrating a repeater device utilized to forward EHF communication between two wireless devices, which may be utilized in accordance with an embodiment of the invention.

FIG. 2 is a block diagram illustrating a repeater device utilized to forward EHF communication between two wireless devices, which may be utilized in accordance with an embodiment of the invention. Referring to FIG. 2, there is shown a source wireless device 202a, a target wireless device 202b, a repeater device 204, EHF connections 206a and 206b, and control connections 208a and 208b.

The source wireless device 202a and the target wireless device 202b may each comprise suitable logic, circuitry, and/or code that may enable receiving, transmitting, and processing of RF signals. For example, the source wireless device 202a and the target wireless device 202b may each comprise the communication subsystem 102, substantially as described in FIG. 1.

The repeater device 204 may comprise suitable logic, circuitry, and/or code that may enable reception and/or transmission of EHF signals to facilitate forwarding EHF signals from the source wireless device 202a to the target wireless device 202b. Additionally, the repeater device 204 may comprise suitable logic, circuitry, and/or code that may enable establishing and/or utilizing control connections 208a and 208b with the source wireless device 202a and/or target wireless device 202b, respectively.

The EHF connections 206a and 206b may each comprise a radio (RF) and/or wireless link that may be based on an EHF protocol that may comprise the 60 GHz interface. The control connections 208a and 208b may each comprise a radio (RF) and/or wireless link that may be based on a non-EHF protocol that may comprise Bluetooth, which may be utilized to communicate control messages between the source wireless device 202a and the repeater device 204, and between the repeater device 204 and the target device 202b, respectively.

In operation, the repeater device 204 may enable forwarding EHF RF signals transmitted from the source wireless device 202a via the EHF connection 206a, to the target wireless device 202b via the EHF connection 206b. EHF communication may generally have limited range, typically operating only in "line-of-sight" settings. Consequently, it may be desirable to utilize other devices, for example, repeater devices such as the repeater device 204, to extend the range of communication between EHF-enabled devices.

The wireless device 202a may utilize the communication subsystem 102 to enable transmission of EHF RF signals via the EHF connection 206a. The wireless device 202b may utilize the communication subsystem 102 to enable reception of EHF RF signals via the EHF connection 206b. The repeater device 204 may be utilized because EHF RF signals may have limited operational range. The source wireless device 202a, the target wireless device 202b, and/or the repeater device 204 may utilize the control connections 208a and/or 208b during EHF communication between the three devices. The control connections 208a and/or 208b may enable exchanging control messages, data, and/or information that may enable facilitating EHF communication. For example, the control connection 208a and/or 208b may enable the repeater device 204 to receive and/or transmit control messages that may enable the source wireless device 202a to transmit EHF RF signals to the repeater device 204 via the EHF connection 206a, and/or may enable the target wireless device 202b to receive EHF RF signals from the repeater device 204 via the EHF connection 206b.

While it may be desirable to utilize the repeater device 204 in forwarding EHF RF signals between the source wireless device 202a and the target wireless device 202b, mechanisms that prevent and/or reduce interference between receive and transmit EHF RF signals at the repeater device 204 may be utilized to optimize performance. For example, spatial isolation may be utilized in the repeater device 204, wherein receive and transmit EHF RF signals in the repeater devices may be performed via narrow beams that may enable minimal interference by transmit EHF RF signals to reception of EHF RF signals received in the repeater device 204. Additionally, signal gain may be applied to the transmit EHF RF signals, wherein the signal strength of the transmit EHF RF signals may be increase to a maximum allowable values that enable maintaining and/or maximizing polarization isolation between the transmit and receive EHF RF signals in the repeater device 204.

In an exemplary embodiment of the invention, phased array antennas may be utilized, in the repeater device 204, to enable narrow beam reception and transmission of EHF RF signals, which may enable spatial isolation between receive and transmit EHF RF signals in the repeater device 204.

Figure 3A:
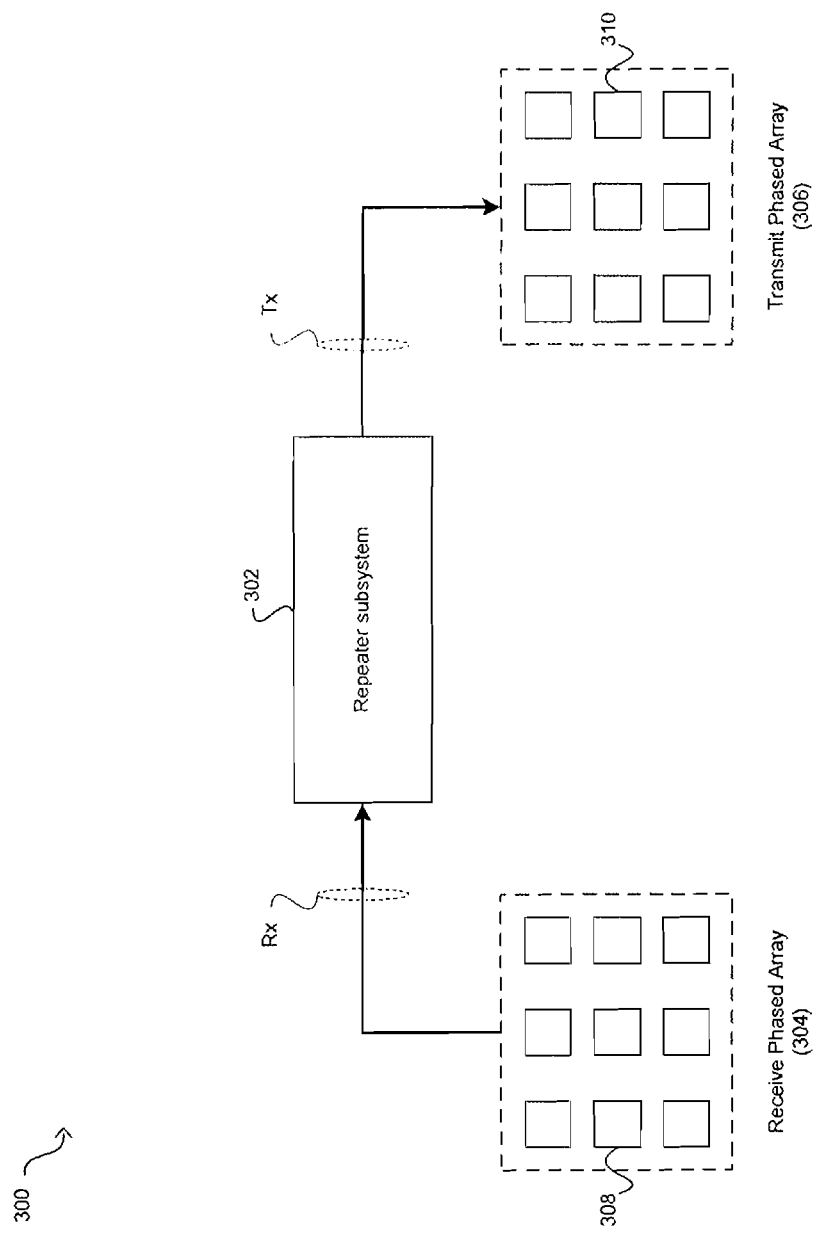
FIG. 3A is a block diagram illustrating a repeater system utilizing phased array antennas to forward EHF communication, in accordance with an embodiment of the invention.

FIG. 3A is a block diagram illustrating a repeater system utilizing phased array antennas to forward EHF communication, in accordance with an embodiment of the invention. Referring to FIG. 3A, there is shown a repeater system 300, a repeater subsystem 302, a receive phased array 304, a receive (Rx) antenna element 306, a transmit (Tx) phased array 308, and a transmit antenna element 310.

The repeater system 300 may comprise the repeater subsystem 302, the receive (Rx) phased array 304, the receive antenna element 306, the transmit (Tx) phased array 308, the transmit antenna element 310, and suitable logic, circuitry, and/or code that may enable reception and/or transmission of EHF signals to facilitate forwarding of EHF signals, wherein the repeater system 300 may be integrated within a repeater device substantially similar to the repeater device 204 as described in FIG. 2.

The repeater subsystem 302 may comprise suitable logic, circuitry, and/or code that may enable controlling and/or performing of signal processing that may be necessary to perform reception and/or transmission of EHF signals via the repeater system 300.

The receive (Rx) phased array 304 may comprise a plurality of receive antenna elements substantially similar to the receive antenna element 306, and suitable logic, circuitry, and/or code that may enable narrow beam reception of EHF RF signals. The receive antenna element 306 may comprise suitable logic, circuitry, and/or code that may enable reception of EHF RF signals. Factors such as the characteristics, number, and/or placement of the plurality of receive antenna elements that may be integrated within the receive phased array 304 may determine the narrow beam reception characteristics of the receive phased array 304.

The transmit (Tx) phased array 308 may comprise a plurality of transmit antenna elements substantially similar to the transmit antenna element 310, and suitable logic, circuitry, and/or code that may enable narrow beam transmission of EHF RF signals. The transmit antenna element 310 may comprise suitable logic, circuitry, and/or code that may enable transmission of EHF RF signals. Factors such as the characteristics, number, and/or placement of the plurality of transmit antenna elements that may be integrated within the transmit phased array 306 may determine the narrow beam transmission characteristics of the transmit phased array 306.

In operation, the repeater system 300 may utilize spatial isolation to prevent and/or reduce interference at the repeater system 300 between EHF RF signals received via EHF by the repeater system 300 and EHF RF signals transmitted from the repeater system 300. Spatial isolation may be achieved by using narrow beams reception and transmission of EHF RF signals. For example, the repeater system 300 may utilize transmit and receive phased array 304 and 308 to enable narrow beams reception and transmission of EHF RF signals in the repeater system 300. Aggregating signals received via the plurality of receive antenna elements that may be integrated within the receive phased array 304 may enable maximizing reception of EHF RF signals, via the receive phased array 304, in a specific and/or narrow direction with minimal reception in other directions. Similarly, aggregating signals transmitted via the plurality of transmit antenna elements that may be integrated within the transmit phased array 306 may enable maximizing transmission of EHF RF signals, via the receive phased array 304, in a specific and/or narrow direction with minimal transmission in other directions. The optimal directions for reception and transmission of EHF RF signals in the repeater system 300 may be set up to enable spatial isolation; wherein the aggregate directional transmission beam of the transmit EHF RF signals may cause minimal and/or negligible interference to the aggregate directional reception beam for the receive EHF RF signals. For example, the receive phased array 304 and the transmit phased array 306 may be set up to enable directional beams of the transmit EHF RF signals and the receive EHF RF signals that are orthogonal.

The repeater system 300 may utilize, for example, control connections 208a and/or 208b, to enable coordinating with the source wireless device 202a and/or the target wireless device 202b to perform spatial isolation in the repeater system 300. For example, the repeater system 300 may utilize control connection 208a to receive information from the source wireless device 202a regarding the receive EHF RF signals, which may be utilized by the repeater system 300 to enable utilizing the receive phase array 304 in the most optimal manner. The repeater system 300 may also utilize control connection 208b to negotiate with the target wireless device 202b settings that may be utilized with transmit EHF RF signals, which may enable the repeater system 300 to configure the transmit phase array 308 during transmission of EHF RF signals.

Figure 3B:
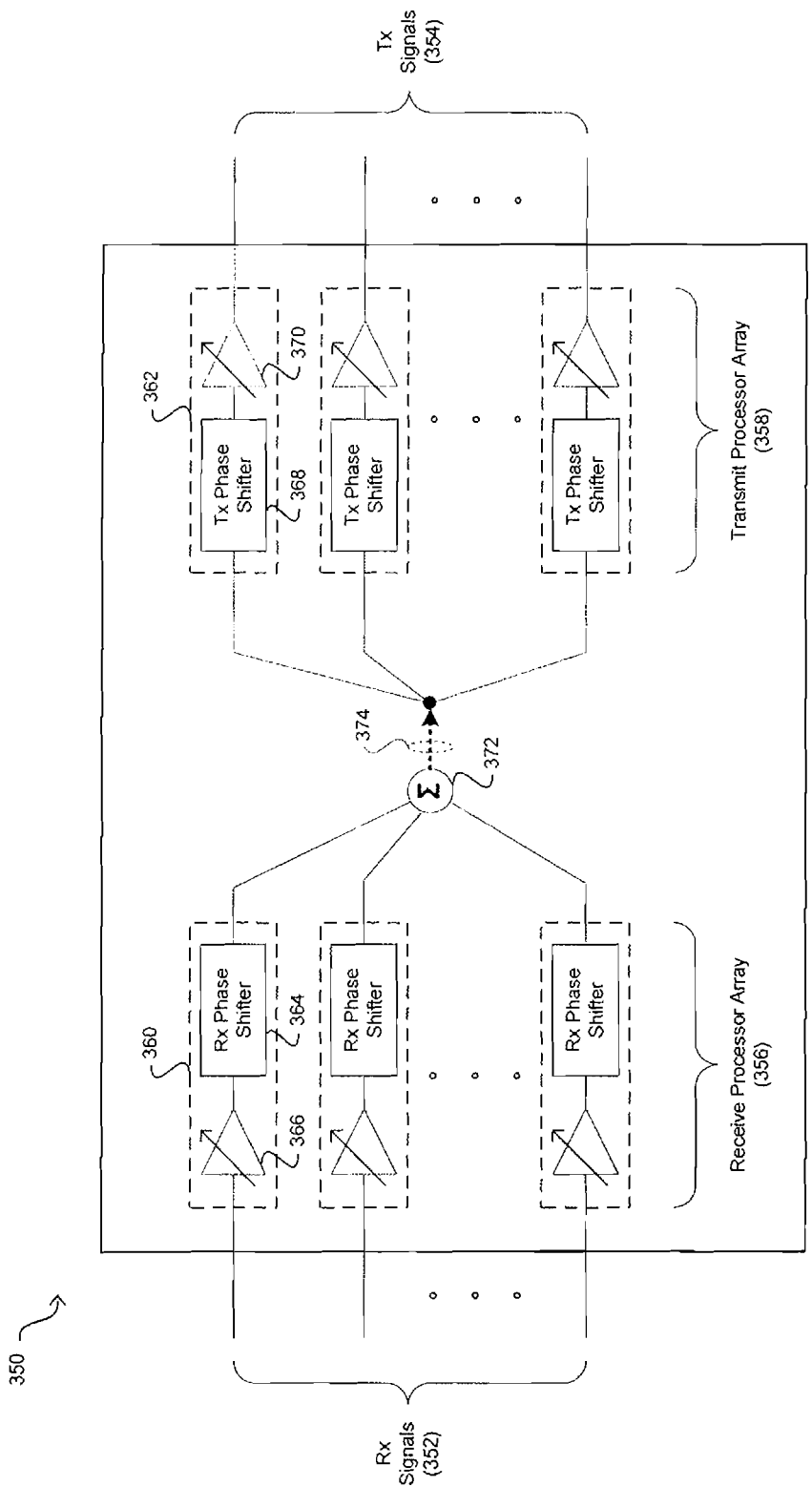
FIG. 3B is a block diagram illustrating a signal processing system that enable utilizing phased array antennas for beamforming between transmit and receive EHF signals, in accordance with an embodiment of the invention

FIG. 3B is a block diagram illustrating a signal processing system that enable utilizing phased array antennas for beamforming between transmit and receive EHF signals, in accordance with an embodiment of the invention. Referring to FIG. 3B, there is shown a phased array processing system 350, a receive signal set 352, a transmit signal set 354, an receive processor array 356, a transmit processor array 358, a receiver processing block 360, a transmitter processing block 362, a receive phase shifter (PA) 364, a receive low-noise amplifier (LNA) 366, a transmit phase shifter (PA) 368, a transmit low-noise amplifier (LNA) 370, a signal combiner 372, and the combined EHF signal 374.

The receive signal set 352 may comprise a plurality of EHF RF signals, which may be received via a plurality of receive antenna elements that may be integrated within a phased array, for example the receive phased array 304. The transmit signal set 354 may comprise a plurality of EHF RF signals, which may be transmitted via a plurality of transmit antenna elements that may be integrated within a phased array, for example the transmit phased array 306. The combined EHF signal 374 may comprise an EHF RF signal, which may correspond to EHF RF signals transmitted by a source wireless device, for example, the source wireless device 202a, and/or expected by a target wireless device, for example the target wireless device 202b.

The phased array processing system 350 may comprise the receive processor array 356, the transmit processor array 358, the signal combiner 372, and suitable logic, circuitry, and/or code that may enable processing signals received and transmitted via phased arrays. For example, the phased array processing system 350 may be integrated within the repeater system 300 to enable utilizing phased arrays to perform spatial isolation via beamforming.

The receive processor array 356 may comprise a plurality of processing blocks, each substantially similar to the receiver processing block 360, and suitable logic, circuitry, and/or code that may enable processing the receive signal set 352. The receiver processing block 360 may comprise the receive PA 364, the receive LNA 366, and suitable logic, circuitry, and/or code that may enable performing signal processing on each of the receive signal set 352 individually.

The transmit processor array 358 may comprise a plurality of processing blocks, each substantially similar to the transmitter processing block 362, and suitable logic, circuitry, and/or code that may enable processing the transmit signal set 354. The transmitter processing block 362 may comprise the transmit PA 368, the transmit LNA 370, and suitable logic, circuitry, and/or code that may enable performing signal processing on each of the transmit signal set 354 individually.

The receive PA 364 and the transmit PA 368 may each comprise suitable logic, circuitry, and/or code that may enable performing signal phase shifting operations on RF signals. The receive LNA 366 and the transmit LNA 370 may each comprise suitable logic, circuitry, and/or code that may enable performing amplifying weak RF signals to reduce and/or prevent noise during transmission and/or reception of the RF signals. The signal combiner 372 may comprise suitable logic, circuitry, and/or code that may enable combining a plurality input signals to generate a single output signal.

In operation, the phased array processing system 350 may be utilized to perform signal processing operation that may pertain to utilizing phase arrays for transmission and/or reception of EHF RF signals. For example, the phased array processing system 350 may be integrated within the repeater system 300, wherein the receive phased array 304 and/or the transmit phased array 306 may be utilized for reception and/or transmission of EHF RF signals.

The receive antenna elements in the receive phased array 304 may enable focusing the reception of EHF RF signal via the receive phased array 304 in a specific and/or narrow direction while limiting and/or cancelling out RF reception in other directions. EHF RF signals received via the receive antenna elements in the receive phased array 304 may be combined to form combined EHF RF signal 374, which may correspond to the EHF RF signal transmitted by the source wireless device 202a and/or expected by the target wireless device 202b. Each of the EHF RF signals in the receive signal set 352 may be processed individually within the receive processor array 356. For example, an EHF RF signal in the receive signal set 352 may be inputted into the receiver processing block 360, wherein signal processing operations may be performed on the inputted signal, including phase and amplitude shifting and/or modifications via the receive LNA 366 and the receive PA 364. Remaining signals in the receive signal set 352 may be processed substantially in the same manner via remaining processing blocks in the receive processor array 360. Signal processing of the individual signals in the receive signal set 352 may enable adjusting the characteristics of the receive signals, including phase and/or amplitude, to enable narrow beam reception via the receive phased array 304. Consequently, aggregating the modified signals of the receive signal set 352, via the signal combiner 372, may enable generating the combined EHF RF signal 374.

Once the receive signal set 352 is processed, EHF RF forwarding may be performed. The combined EHF RF signal 374 may be transmitted via the transmit phased array 306, wherein the transmit signal set 352 may be generated from the combined EHF RF signal 374 for transmission via the transmit phased array 306. Aggregating signals transmitted via the plurality of transmit antenna elements that may be integrated within the transmit phased array 306 may enable maximizing transmission of EHF RF signals, via the receive phased array 304, in a specific and/or narrow direction with minimal transmission in other directions.

Each of the EHF RF signals in the transmit signal set 352 may be processed individually within the transmit processor array 356. For example, the combined EHF RF signal 374 may be inputted into the transmitter processing block 362 to generate one of the signals in the transmit signal set 354, wherein signal processing operations may be performed, including phase and amplitude shifting and/or modifications, via the transmit LNA 370 and the transmit PA 368. Remaining signals in the transmit signal set 354 may be generated substantially in the same manner via remaining processing blocks in the receive processor array 360. Signal processing of the individual signals in the transmit signal set 354 may enable adjusting the characteristics of the individual transmit signals, including phase and/or amplitude, to enable narrow beam transmission via the transmit phased array 306. Consequently, an aggregate effect of the transmission of the modified signals of the transmit signal set 352 may enable beamforming via the repeater system 300.

In an embodiment of the invention, transmit and/or receive LNAs, and/or transmit and/or receive PAs may be programmable. Accordingly, the transmit and/or receive LNAs, and/or transmit and/or receive PAs may be modified based on information received from the source wireless device 202a and/or the target wireless device 202b. For example, location information may be utilized to modify the transmit and/or receive LNAs, and/or transmit and/or receive PAs to enable adjusting the beam directional settings of the receive phased array 304 and/or the transmit phased array 306. Additional, the programmability of the transmit and/or receive LNAs, and/or transmit and/or receive PAs may enable reprogramming the phased array processing system 350 where changes in the repeater system 300 may require adjusting and/or modifying the signal processing operation in the system. For example, utilizing different and/or new phased arrays may necessitate utilizing different signal processing operation; consequently, the transmit and/or receive LNAs, and/or transmit and/or receive PAs in the phased array processing system 350 may be reprogrammed to perform compatible signal processing operations.

Figure 4:
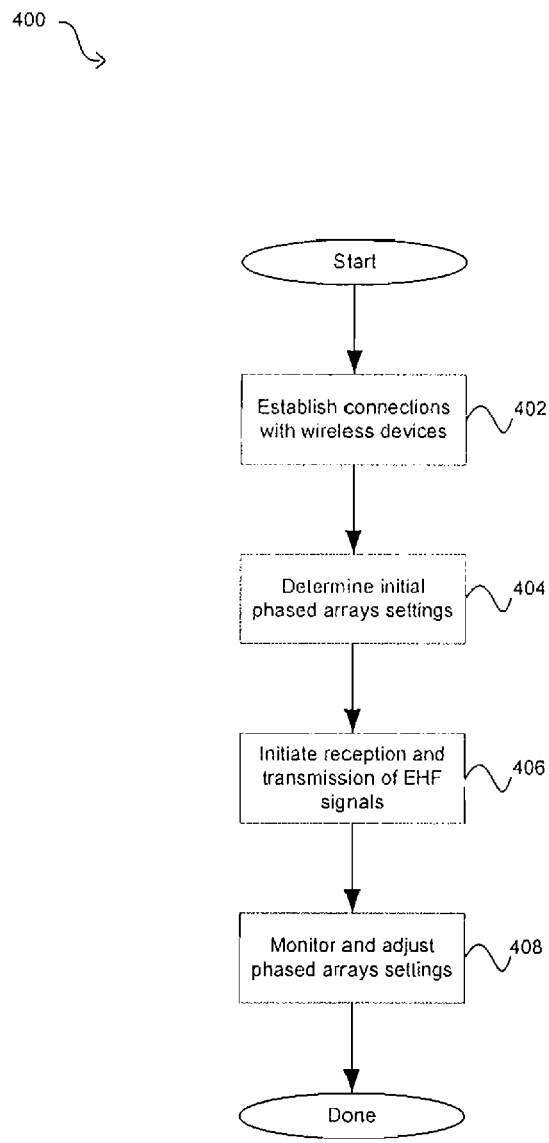
FIG. 4 is an exemplary flow diagram illustrating use of beamforming, via phased array antennas, to generate spatial isolation in a repeater device, in accordance with an embodiment of the invention.

FIG. 4 is an exemplary flow diagram illustrating use of beamforming, via phased array antennas, to generate spatial isolation in a repeater device, in accordance with an embodiment of the invention. Referring to FIG. 4, there is shown a flow chart 400 comprising a plurality of exemplary steps. In step 402, the repeater device 204 may establish control connections 208a and 208b with the source wireless device 202a and the target wireless device 202b, respectively, to enable interactions among the devices during EHF RF communication. In step 404, initial phased array antennas settings consistent with spatial isolation may be determined. For example, where the repeater device 204 may comprise the repeater system 300, configuration that enable beamforming for reception and transmission of EHF RF signals via receive phased array 304 and transmit phased array 306 may be determine to enable spatial isolation between EHF RF signals transmitted by the source wireless device 202a, transmit EHF RF signals transmitted to the target wireless device 202b. In instances where the repeater system 300 may comprise the phased array processing system 350, the receive processor array 356 and the transmit processor array 358 may enable processing signals received and/or transmitted via receive and/or transmit antenna elements in the receive phased array 304 and transmit phased array 306 to enable necessary beamforming operations, substantially as described in FIG. 3B.

In step 406, EHF RF communication may be initiated between the repeater 204, and/or wireless devices 202a and/or 202b. For example, once the repeater device 204 may complete initial phased array setting as determined in step 404, the repeater device 204 may communicate to the wireless devices 202a and/or 202b, via control connections 208a and/or 208b, respectively, that the repeater device 204 may be ready for EHF forwarding operation. Accordingly, the source wireless device 202a may commence transmitting EHF RF signals to the repeater device 204, and/or the target wireless device 202b may initiate EHF RF signals reception operations. In step 408, phased array antennas settings may be monitored and/or adjusted to ensure continued spatial isolation. For example, where the repeater system 300 may comprise the phased array processing system 350, location information received from the source wireless device 202a and/or the target wireless device 202b, via the control connections 208a and/or 208b, may be indicate change of location that may necessitate adjustment of the receive phased array 304 and/or the transmit phased array 306. Consequently, processing blocks within the receive processor array 356 and/or transmit processor array 358 may be modified to enable adjusting processing signals received and/or transmitted via receive and/or transmit antenna elements in the receive phased array 304 and transmit phased array 306 in accordance with the changed location, substantially as described in FIG. 3B.

Various embodiments of the invention may comprise a method and system for signal repeater with gain control and spatial isolation. The repeater device 204 may enable forwarding extreme high frequency (EHF) communication between the source wireless device 202a and the target wireless device 202b. The repeater device 204 may utilize spatial isolation to prevent and/or reduce interference between received and transmitted EHF RF signals. Reception and/or transmission of EHF RF signals in the repeater device 204 may be performed via narrow beams that may enable minimal interference by transmit EHF RF signals to reception of EHF RF. The repeater device 204 may utilize repeater system 300, with receive phased array 304 and transmit phased array 306, to enable performing beamforming via use of phased arrays.

The repeater system 300 my utilize the phased array processing system 350 to enable processing signals received and/or transmitted via antenna elements in the receive phased array 304 and/or the transmit phased array 306. The signal processing operation that enable beamforming for reception and transmission of EHF RF signals via receive phased array 304 and transmit phased array 306 may be performed by the phased array processing system 350. The phased array processing system 350 may comprise low-noise amplifiers (LNAs) and phase shifters (PAs) that may enable performing processing operation on signals received and/or transmitted via antenna elements in the receive phased array 304 and/or the transmit phased array 306. The LNAs and/or PAs may be programmable to enable dynamic modification of the signal processing operation based on information received from the source wireless device 202a and/or target wireless device 202b, via the control connections 208a and/or 208b, respectively.

Another embodiment of the invention may provide a machine-readable storage, having stored thereon, a computer program having at least one code section executable by a machine, thereby causing the machine to perform the steps as described herein for signal repeater with gain control and spatial isolation.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, said method comprising:

spatially isolating signal interference between receive (Rx) and transmit (Tx) signals in a repeater device, wherein said spatially isolating comprises utilizing beamforming during reception and/or transmission of extremely high frequency (EHF) signals in said repeater device;

forwarding, by said repeater device, said EHF signals to extend a range of said EHF signals communicated between a plurality of wireless devices;

generating, by said repeater device, a plurality of transmit signals from a combined EHF signal, said plurality of transmit signals corresponding to a plurality of transmit antenna elements.

2. The method of claim 1, wherein said EHF signals comprise signals with frequency of at least 60 GHz.

3. The method of claim 1 further comprising configuring one or more receive (Rx) phased arrays to perform said beamforming in said repeater device.

4. The method of claim 1 further comprising configuring one or more transmit (Tx) phased arrays to perform said beamforming in said repeater device.

5. The method of claim 1 further comprising utilizing Low-Noise Amplifiers (LNAs) and Phase Shifters while receiving and/or transmitting signals.

6. The method of claim 5, wherein said Low-Noise Amplifiers (LNAs) and/or Phase Shifters are programmable.

7. The method of claim 1, wherein said plurality of transmit antenna elements are integrated within one or more transmit (Tx) phased arrays.

8. The method of claim 1, wherein said spatially isolating is performed in said repeater device by utilizing one or more control connections between said repeater device, and a source wireless device and/or a target wireless device.

9. The method of claim 8, wherein said one or more control connections comprise non-extremely high frequency (non-EHF) connections.

10. The method of claim 8, wherein said one or more control connections comprise Bluetooth (BT) connections and/or ultra-wideband (UWB) connections.

11. A system for wireless communication, said system comprising:

one or more circuits that enable spatially isolating signal interference between receive (Rx) and transmit (Tx) signals in a repeater device, wherein said one or more circuits enable beamforming during reception and/or transmission of extremely high frequency (EHF) signals in said repeater device;

said one more circuits enable forwarding said EHF signals to extend a range of said EHF signals communicated between a plurality of wireless devices;

said one or more circuits enable generating a plurality of transmit signals from a combined EHF signal, said plurality of transmit signals corresponding to a plurality of transmit antenna elements.

12. The system of claim 11, wherein said EHF signals comprise signals with frequency of at least 60 GHz.

13. The system of claim 11, wherein said one or more circuits enable configuring one or more receive (Rx) phased arrays to perform said beamforming in said repeater device.

14. The system of claim 11, wherein said one or more circuits enable configuring one or more transmit (Tx) phased arrays to perform said beamforming in said repeater device.

15. The system of claim 11, wherein said system utilizes Low-Noise Amplifiers (LNAs) and Phase Shifters while receiving and/or transmitting signals.

16. The system of claim 15, wherein said Low-Noise Amplifiers (LNAs) and/or Phase Shifters are programmable.

17. The system of claim 11, wherein said plurality of transmit antenna elements are integrated within one or more transmit (Tx) phased arrays.

18. The system of claim 11, wherein said spatially isolating is permformed in said repeater device by utilizing one or more control connections between said repeater device, and a source wireless device and/or a target wireless device.

19. The system of claim 18, wherein said one or more control connections comprise non-extremely high frequency (non-EHF) connections.

20. The system of claim 18, wherein said one or more control connections comprise Bluetooth (BT) connections and/or ultra-wideband (UWB) connections.

\* \* \* \* \*